(12) United States Patent
Yun (10) Patent No.: US 7,857,324 B2
(45) Date of Patent: Dec. 28, 2010

(54) MOTORCYCLE SIDECAR (76) Inventor: Hi-Yun Yun, Munhwa Apt. 102, 1441-3, Sinjeong 1-Dong, Nam-Gu, Ulsan (KR) 680-825

( * ) Notice: Subject to any disclaimer, the term of this patent is extended or adjusted under 35 U.S.C. 154(b) by 0 days.

(21) Appl. No.: 12/598,646

(22) PCT Filed: Jun. 26, 2008

(86) PCT No.: PCT/KR2008/003707

§ 371 (c)(1),
(2), (4) Date: Nov. 3, 2009

(87) PCT Pub. No.: WO2009/005250

PCT Pub. Date: Jan. 8, 2009

(65) Prior Publication Data

US 2010/0090421 A1    Apr. 15, 2010

(30) Foreign Application Priority Data

Jun. 29, 2007    (KR) .................... 10-2007-0065160

(51) Int. Cl.
*B62K 27/02* (2006.01)
*B60G 3/26* (2006.01)
*B60G 7/02* (2006.01)

(52) U.S. Cl. ...................... 280/5.52; 280/203
(58) Field of Classification Search ........... 180/209, 180/210; 280/5.52, 203
See application file for complete search history.

(56) References Cited

U.S. PATENT DOCUMENTS

| 1,069,788 | A | * | 8/1913 | Johnson | 280/203 |
| 1,437,115 | A | * | 11/1922 | Morton | 280/203 |
| 3,788,670 | A | * | 1/1974 | Petersen | 280/203 |
| 3,941,405 | A | | 3/1976 | Vetter | |
| 4,254,965 | A | | 3/1981 | Kobel | |
| 4,385,770 | A | | 5/1983 | Mitchell | |
| 4,548,419 | A | | 10/1985 | Pigott et al. | |
| 5,308,096 | A | | 5/1994 | Smith | |

OTHER PUBLICATIONS

International Search Report for Application No. PCT/KR2008/003707, dated Jan. 6, 2009.

\* cited by examiner

*Primary Examiner*—Eric Culbreth
*Assistant Examiner*—Joseph Rocca
(74) *Attorney, Agent, or Firm*—EuiHoon Lee, Esq.

(57) ABSTRACT

A motorcycle sidecar is provided which includes a wheel positioned a given distance from wheels of a motorcycle, a wheel supporting assembly supporting the wheel in a manner that enables the wheel to be rotated, and absorbing road shocks, a stabilizer assembly connecting the wheel supporting assembly to a body of the motorcycle to enable the wheel supporting assembly to be leaned when the motorcycle is leaned, and a main body installed on the stabilizer assembly, for transporting a passenger or a thing. When the motorcycle is leaned to the right or left during driving, the wheel is leaned to the right or left at the same angle with the ground as the motorcycle. Thus, the motorcycle can be safely driven without reducing the speed to the considerable degree, when it goes around a curve.

9 Claims, 8 Drawing Sheets

MOTORCYCLE SIDECAR

RELATED APPLICATIONS

This application is a 35 U.S.C. §371 national stage filing of PCT Application No. PCT/KR2008/003707 filed on Jun. 26, 2008, which claims priority to, and the benefit of, Korean Patent Application No. 10-2007-0065160 filed on Jun. 29, 2007. The contents of the aforementioned applications are hereby incorporated by reference.

TECHNICAL FIELD

The present invention relates to a sidecar, attached to a motorcycle, which enables the motorcycle to be safely driven at high speed while it goes around a curve.

BACKGROUND ART

A motorcycle is equipped with a saddle on which a rider sits and saddlebacks or panniers behind the saddle. It is dangerous for a rider driver and a passenger to sit together on the saddle. The saddlebacks or the panniers are too small to carry lots of things, or a heavy thing.

A sidecar is designed to be attached to the motorcycle to transport the passenger or the things.

However, a conventional sidecar is kept in the upright position while the motorcycle goes around a curve. This requires the motorcycle to reduce the speed and enlarge a turning radius when it enters a curve.

The motorcycle with the conventional sidecar is required to reduce the speed when it enters a curve. Otherwise, the motorcycle with the conventional sidecar may be overturned by centrifugal force.

DISCLOSURE OF THE INVENTION

Technical Problem

Therefore, an object of the present invention is to provide a sidecar which is leaned to the right or left at the same angle as a motorcycle with the sidecar while the motorcycle with the sidecar goes around a curve.

Technical Solution

To achieve the object, there is provided a sidecar including a wheel positioned a given distance from wheels of a motorcycle, a wheel supporting assembly, the wheel supporting assembly supporting the wheel in a manner that enables the wheel to be rotated, and absorbing road shocks, a stabilizer assembly connecting the wheel supporting assembly to a body of the motorcycle to enable the wheel supporting assembly to be leaned when the motorcycle is leaned, and a main body installed on the stabilizer assembly, for transporting a passenger or a thing.

MODES FOR CARRYING OUT THE PREFERRED EMBODIMENTS

Description will now be given in detail of the preferred embodiments of the present invention, examples of which are illustrated in the accompanying drawings.

Figure 1:
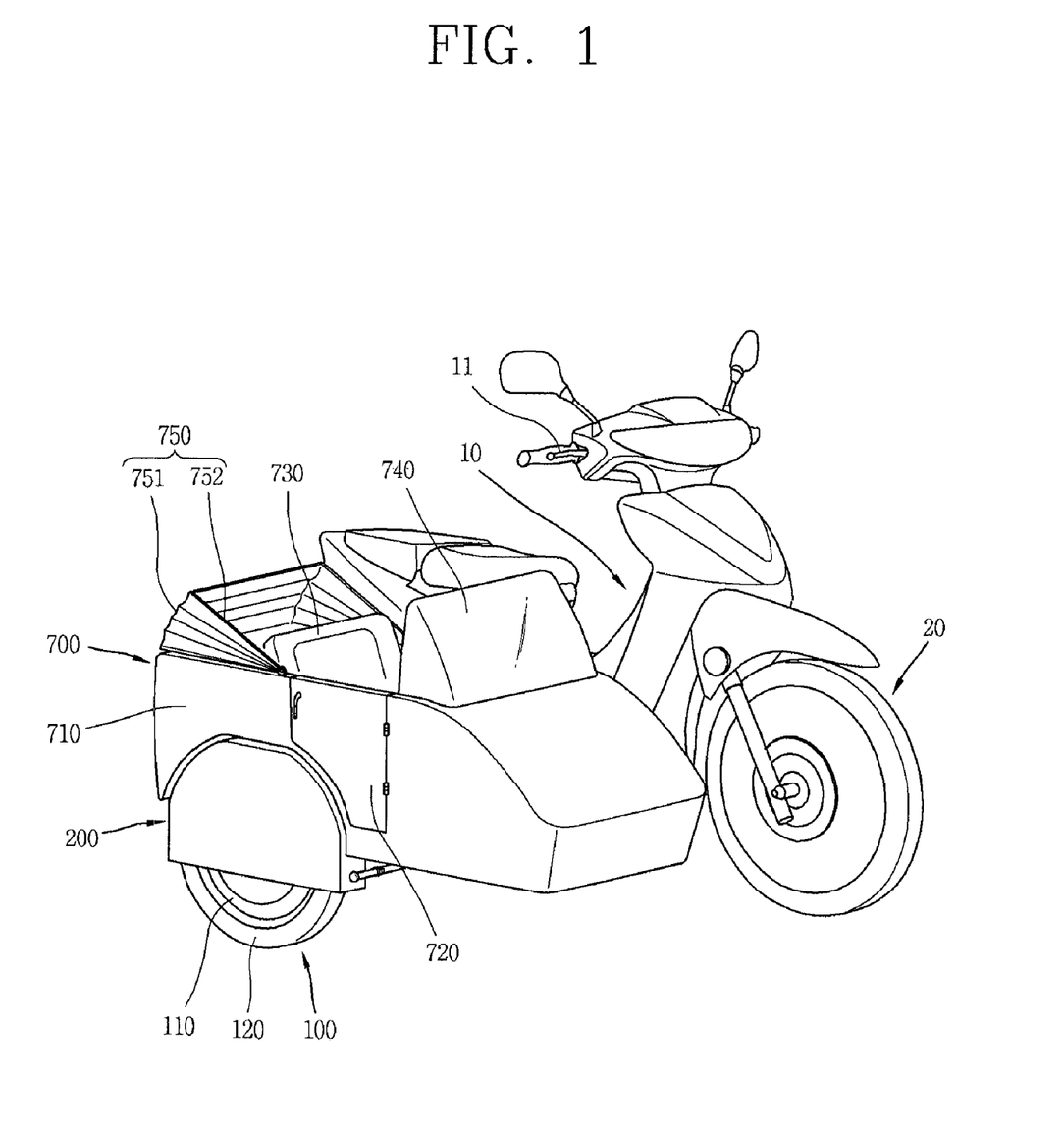
FIG. 1 is a perspective view of a motorcycle sidecar according to the present invention and a motorcycle to which the sidecar is attached.
Figure 2:
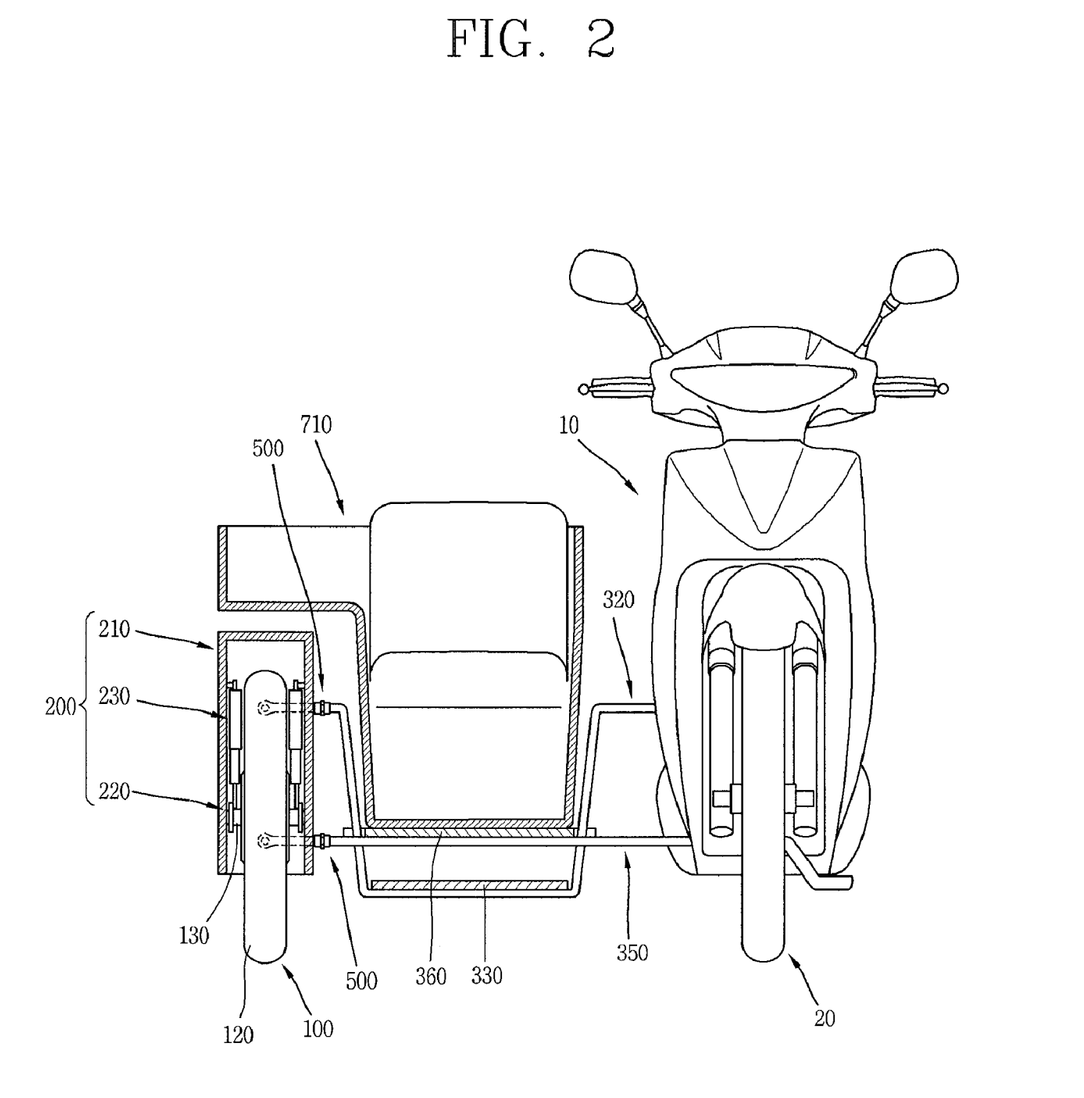
FIG. 2 a front view of the motorcycle sidecar according to the present invention and the motorcycle to which the motorcycle sidecar is attached.
Figure 3:
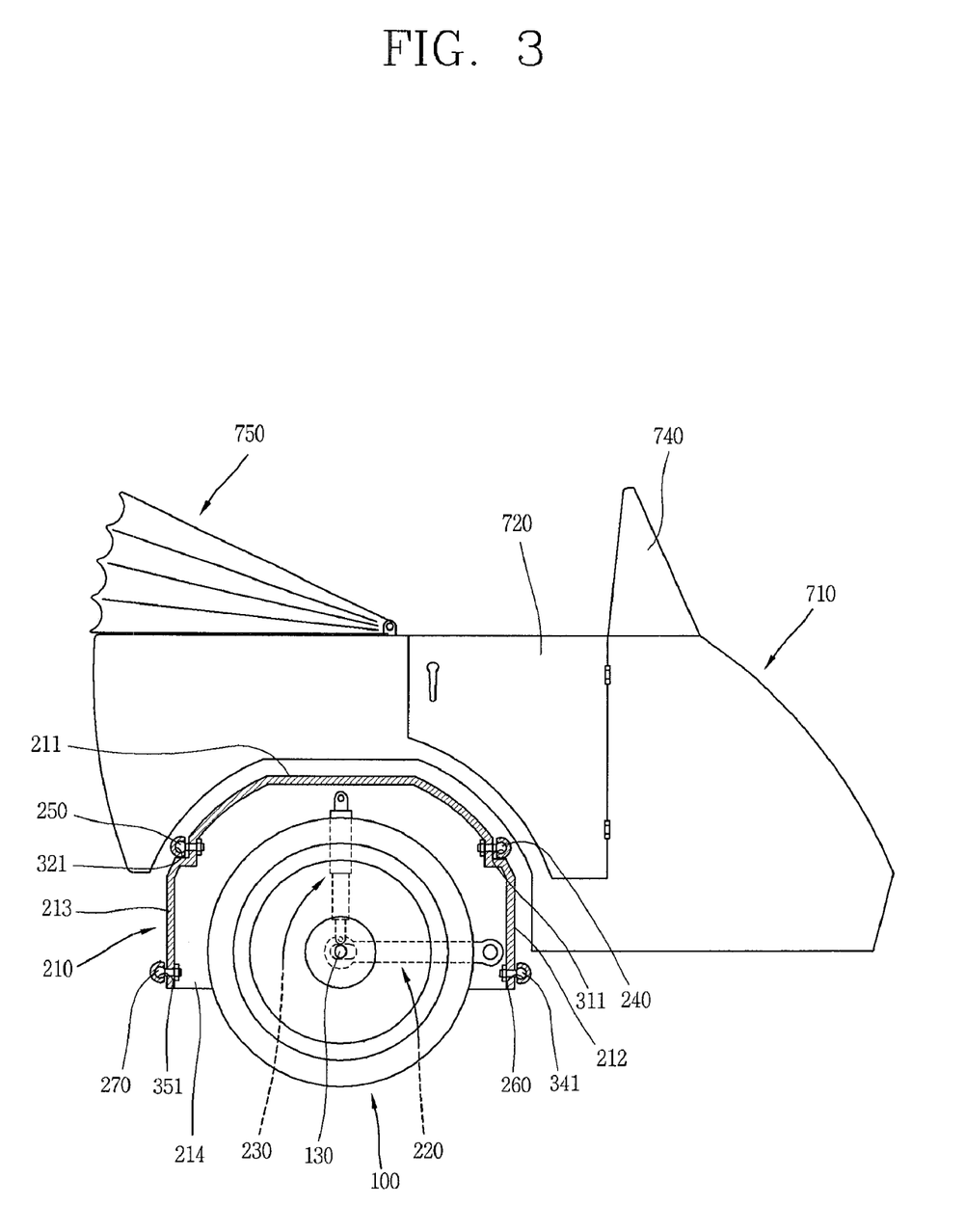
FIG. 3 is a side view of the motorcycle sidecar according to the present invention.

FIG. 1 is a perspective view of a motorcycle sidecar according to the present invention and a motorcycle to which the motorcycle sidecar is attached. FIG. 2 a front view of the motorcycle sidecar according to the present invention and the motorcycle to which the motorcycle sidecar is attached. FIG. 3 is a side view of the motorcycle sidecar according to the present invention.

Referring to FIGS. 1, 2 and 3, the motorcycle sidecar according to an embodiment of the present invention is now described.

In general, the motorcycle includes a body 10, a pair of wheels 20, one in the front of the body 10 and the other in the rear of the body 10, an engine (not shown), mounted to the body 10, producing power to move the motorcycle, a transmission (not shown) transmitting the power from the engine to the rear wheel, and a braking system (not shown) slowing or stopping the motion of the motorcycle.

The power produced by the engine is transmitted through the transmission to the wheel to drive the motorcycle whose the wheels are in contact with the ground.

According to the embodiment of the present invention, a motorcycle sidecar comprises a wheel 100, a wheel supporting assembly 200, a stabilizer assembly 300, and a main body 700.

The wheel 100 includes a frame 110, a tire 120 mounted on the frame 110, and an axle 130 connected to the frame 110.

The wheel supporting assembly 200 supports the wheel 100 in a manner that enables the wheel 100 to be rotated, and absorbs vibration caused by road shock to prevent it from reaching the body. The road shock is the action resulting from the wheel moving up and down as they meet bumps or holes in the road.

Figure 4:
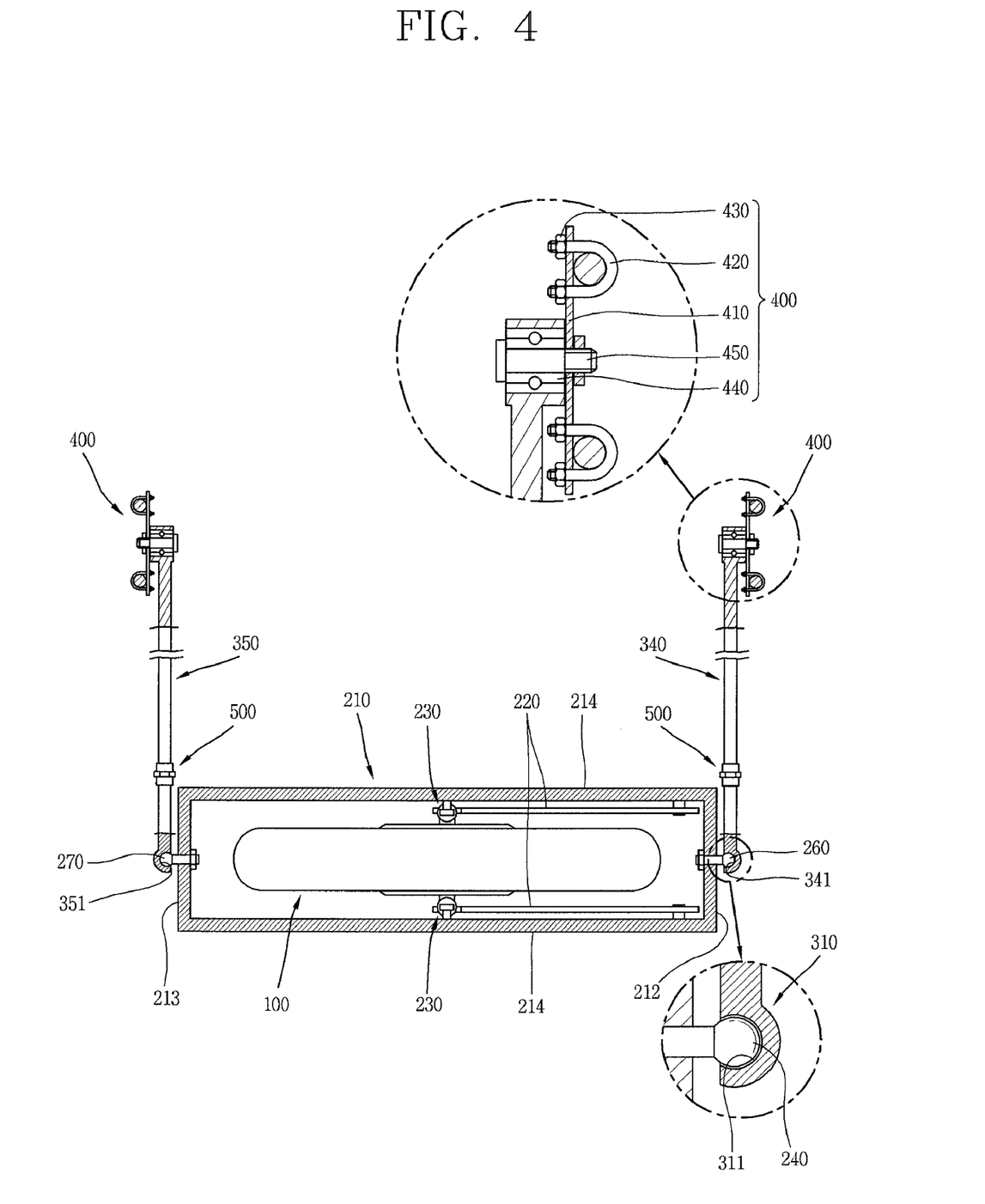
FIG. 4 is a plane, cross-sectional view of a wheel supporting assembly according to the present invention.

As an example, the wheel supporting may include a housing 210 having a space inside, two links 220, one end of each being rotatably connected to the housing 210, and the other end of each having a longitudinal hole, and two suspensions, one end of each being connected to the axle 130 and the other of each to the housing 210.

As an example, the housing 210, is hexahedron-shaped and has an opening on the bottom. That is, the housing 210 has an upper plate 211, front and rear plates 212 and 213, and lateral plates 214. The upper, front, rear, and lateral plates are all connected to each other. Each of the lateral plates 214 has a semi-circled opening on one side. The front plate 212 is near the front wheel of the motorcycle and the rear plate 213 is near the rear wheel of the motorcycle.

The one link 220 is connected to an internal or external side of the one lateral plate of the housing 210, and the other link 220 to an internal or external side of the other lateral plate of the housing 210.

The one end of the axle 130 is inserted into the longitudinal hole on the one link 220, and the other end of the axle 130 into the longitudinal hole on the other link 220.

One end of the one suspension 230 is connected to the housing 210 and the other end of the one suspension 230 is connected to the one end of the axle 130. One end of the other suspension 230 is connected to the housing 210, and the other end of the other suspension 230 to the other end of the axle 130.

The other end of the suspension 230 may be connected to the link 220, not to the other end of the axle 130.

The suspensions 230 support the axle 130 or the links 220 using their elasticity. The suspensions 230 allow the sidecar to travel over rough surfaces with a minimum of up-and-down body movement.

The stabilizer assembly 300 connects the wheel supporting assembly 200 to the body 10. When the motorcycle is leaned to the right or left while going around a curve, the stabilizer bars 300 enables the wheel supporting assembly 200 to be leaned to the right or left. That is, the motorcycle and the wheel supporting assembly 200 are leaned in the same direction, at the same angle with the ground. Thus, the wheel 100 is leaned in the same direction, at the same angle with the ground.

Figure 5:
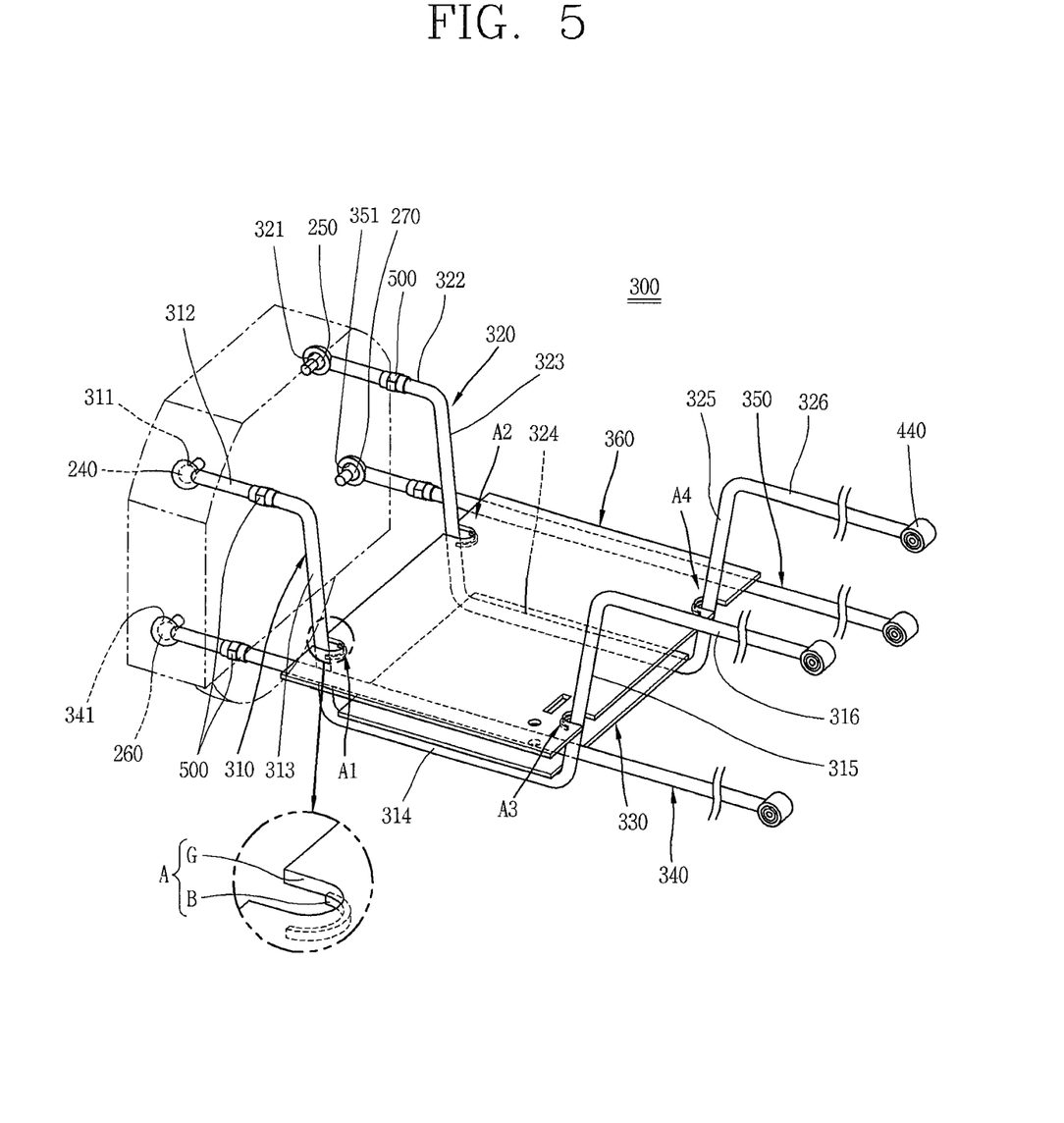
FIG. 5 is a perspective view of a stabilizer assembly according to the present invention.

As shown in FIGS. 4 and 5, the stabilizer assembly 300 includes first and second upper stabilizer bars 310 and 320, a first connecting member 330, first and second lower stabilizer bars 340 and 350, and a second connecting member 360.

Each of the first and second stabilizer bars 310 and 320 has a given length.

One end of each of the first and second upper stabilizer bar 310 and 320 may be connected to the housing 210. The one end of the first upper stabilizer bar 310 is movably connected to an upper side of the front plate 213 of the housing 210, and the other end of the first upper stabilizer bar 310 is detachably connected to an upper side of the body 10 of the motorcycle. The one end of the second upper stabilizer bar 320 is movably connected to an upper portion of the rear plate 213 of the housing 210, and the other end of the second upper stabilizer bar 320 is detachably connected to an upper side of the body 10 of the motorcycle.

The first and second upper stabilizer bars 310 and 320 are in parallel spaced and arranged relative to each other.

The first connecting member 330 may be a rectangular plate with specified thickness.

One side of the first connecting member 330 is connected to the first upper stabilizer bar 310 and the opposite side of the first connecting member 330 is connected to the second upper stabilizer bar 320. Thus, the first connecting member 330 keeps the first and second upper stabilizer bars 310 and 320 separated a given distance from each other.

The first upper stabilizer bar 310 has a socket 311 on one end, and the second upper stabilizer bars 320 has a sockets 321 on one end.

The front plate 212 of the housing 210 has a connection part 240 on the upper side. The connection part 240 is inserted into the socket 311.

The rear plate 213 of the housing 210 has a connection part 250 on the upper side. The connection part 250 is inserted into the socket 321.

The connection part 240 on the upper side of the front plate 212 of the housing 210, and the connection part 250 on the upper side of the rear plate 212 of the housing 210 may be all in a wheel center line. The wheel center line is an imaginary line that is drawn through the center of the wheel 100 from above to below.

As an example, the connection parts 240 and 250 may be ball-shaped, and the sockets 311 and 321 may be ball-shaped. Thus, the connection parts 240 and 250 fit into the sockets 311 and 312, respectively.

Each of the first and second lower stabilizer bars 340 and 350 has a given length.

One end of the first lower stabilizer bar 340 and one end of the second lower stabilizer bar 350 may be connected to the housing 210. The one end of the first lower stabilizer bar 340 is movably connected to the lower side of the front plate 212, and the other end of the first lower stabilizer bar 340 is detachably connected to the lower side of the body 10 of the motorcycle. The one end of the second lower stabilizer bar 350 is movably connected to the lower side of the rear plate 213, and the other end of the second lower stabilizer bar 350 is detachably connected to the lower side of the body 10 of the body 10 of the motorcycle.

The first and second lower stabilizer bars 340 and 350 are in parallel spaced and arranged relative to each other.

The distance between the first and second lower stabilizer bars 340 and 350 is larger than that between the first and second upper stabilizer bars 310 and 320.

The second connecting member 360 may be a rectangular plate with specified thickness.

One side of the second connecting member 360 is connected to the first lower stabilizer bar 340 and the opposite side of the second connecting member 360 is connected to the second lower stabilizer bar 320. Thus, the second connecting member 360 keeps the first and second lower stabilizer bars 340 and 350 separated a given distance from each other.

The area of the second connecting member 350 is larger than that of the first connecting member 330.

The first lower stabilizer bar 340 has a socket 341 on one end, and the second lower stabilizer bars 350 has a sockets 351 on one end.

The front plate 212 of the housing 210 has a connection part 260 on the lower side. The connection part 240 is inserted into the socket 311.

The rear plate 213 of the housing 210 has a connection part 270 on the lower side. The connection part 250 is inserted into the socket 321.

The connection part 260 on the lower side of the front plate 212 of the housing 210, and the connection part 270 on the lower side of the rear plate 212 of the housing 210 may be all in a wheel center line. The wheel center line is an imaginary line that is drawn through the center of the wheel 100 from above to below.

As an example, the connection parts 260 and 270 may be ball-shaped, and the sockets 341 and 351 may be ball-shaped. Thus, the first connection parts 240 and 250 fit into the first sockets 311 and 312, respectively.

The first and second upper stabilizer bars 310 and 320 and the first and second lower rods 340 and 350 are all detachably connected to the body 10 of the motorcycle, through a jointing unit 400. The first and second upper stabilizer bars 310 and 320 and the first and second lower stabilizer bars 340 and 350 vertically rotate about the jointing unit 400.

As an example, the jointing unit 400 includes a bracket 410 having a plurality of pierced holes and one threaded hole, U-shaped bolts 420 and nuts 430 that connect the bracket 410 and a pipe that is part of the body 10 of the motorcycle, bearings 440, each connected to the one end of each of the upper and lower stabilizer bars, and a bolt 450 with a head on one end, which fits into the threaded hole through the bearing 440. Two sets of the bolt and nut may be installed on two regions of the bracket 410, respectively. The bearing 440 includes a ball bearing and a bushing.

Each of the first and second upper stabilizer bars 310 and 320 may be longitudinally bent at two or more points on itself to given angles. For example, as shown in FIG. 5, the first upper stabilizer bar 310 may have a first horizontal portion 312, a first inclined portion 313 bent downward from the first horizontal portion 312, a second horizontal portion 314 bent to the right from the first inclined portion 313, a second inclined portion 315 bent upward from the second horizontal portion 314, and a third horizontal portion 316 to the right bent from the second inclined portion 315.

One end of the first horizontal portion 312 of the first upper stabilizer bar 310 is detachably connected to the housing 210, and one end of the third horizontal portion 316 is detachably connected to the body 10 of the motorcycle. The first, second, and third horizontal portions 312,314, and 316 are in the horizontal line, and the first and second inclined portions 313 and 315 are inclined to the second horizontal portion 314. The first horizontal portion 312 is in line with and third horizontal portion 316, and the second horizontal portion 314 is positioned below the first and third horizontal portions 312 and 316.

The second upper stabilizer bar 320 has the same shape as the first upper stabilizer bar 310. The second upper stabilizer bar 320, like the first upper stabilizer bar 310, may have a first horizontal portion 322, a first inclined portion 323, a second horizontal 324, a second inclined portion 325, and a third horizontal portion 326.

Each of the first and second lower stabilizer bars 340 and 350 have a straight line shape.

The second horizontal portion 314 of the first upper stabilizer bar 310 and the second horizontal portion 324 of the second upper stabilizer bar 320 are positioned below the first and second lower stabilizer bars 340 and 350. One side of the first connecting member 330 is mounted on the second horizontal portion 314 of the first upper stabilizer bar 310, and the opposite side of the first connecting member 330 is mounted on the second horizontal portion 324 of the second upper stabilizer bar 320. Thus, the first connecting member 330 is positioned under the second connecting member 360 which is mounted on the first and second upper stabilizer bars 340 and 350. The first and second connecting members 330 and 360 are vertically spaced relative to each other.

When the motorcycle goes around a curve, it is leaned to one side, i.e., to the right or left. At this point, the higher a portion of the motorcycle is located from the ground, the more the portion of the motorcycle is leaned to the right or left.

Thus, when the motorcycle is leaned to the right or left, a distance which the first and second upper stabilizer bars 310 and 320 horizontally move is larger than that which the first and second lower stabilizer bars 340 and 350 horizontally move.

The second connecting member 360 has four semi-circle pockets G, two on one side and two on the opposite side. A semi-circle ring B is installed inside the semi-circle pocket B. The semi-circle pockets G and the semi-circle rings B serve as a stopper A to limit distances that the first and second upper stabilizer bars 310 and 320 can move, horizontally, i.e., to the right or left.

The stoppers A1 and A2 are positioned in front of the first inclined portion 313 of the first upper stabilizer bar 310 and the first inclined portion 313 of the first upper stabilizer bar 320, respectively. The stoppers A3 and A4 are positioned in front of the second inclined portion 315 of the first upper stabilizer bar 310 and the second inclined portion 325 of the second upper stabilizer bar 320, respectively.

When the first and second upper stabilizer bars 310 and 320 moves toward two the wheel-supporting assembly 200, the first and second upper stabilizer bars 310 and 320 cannot horizontally move beyond a given point because the inclined portions 315 and 325 is stopped by the third and fourth stoppers A 3 and A4 at the given point. When the first and second upper stabilizer bars 310 and 320 moves toward the body 10 of the motorcycle, the first and second upper stabilizer bars 310 and 320 cannot horizontally move beyond a given point because the inclined portions 313 and 323 is stopped by the third and fourth stoppers A 1 and A2 at the given point.

The motorcycle should not be leaned to one side, by more than 25 degrees during driving. When the motorcycle is leaned to one side, by more than 25 degrees, the motorcycles may fall down. The stoppers prevent the motorcycle from being leaned beyond the given angle.

Figure 6:
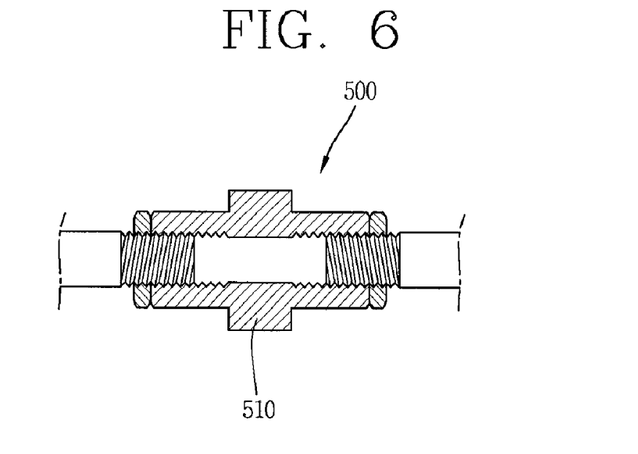
FIG. 6 is a plane, cross-sectional view of a length adjusting unit according to the present invention.

A length adjusting unit 500 may be provided to each of the first and second upper stabilizer bars 310 and 320, and the first and second lower stabilizer bars 340 and 350. The length adjusting unit 500 adjusts straight-line lengths of the first and second upper stabilizer bars 310 and 320, and lengths of the first and second lower stabilizer bars 340 and 350.

That is, the length adjusting unit 500 makes the straight-line lengths of the first and second upper stabilizer bars 310 and 320 larger or smaller than the lengths of the first and second lower stabilizer bars 340 and 350. And, the length adjusting unit 500 makes the lengths of the first and second lower stabilizer bars 340 and 350 larger or smaller than the straight-line lengths of the first and second upper stabilizer bars 310 and 320.

As the straight-line lengths of the first and second upper stabilizer bars 310 and 320 becomes shorter than the lengths of the first and second lower stabilizer bars 340 and 350, the upper portion of the wheel 100 becomes more leaned toward the body 10 of the motorcycle.

As an example, as shown in FIG. 6, the length adjusting unit 500 may be a turnbuckle. Each of the first and upper stabilizer bars 310 and 320 and the first and second stabilizer bar 340 and 340 is cut into two parts. The surface of the cut end of the one part is externally threaded in a right hand direction, and the surface of the cut end of the other part is externally threaded in a left hand direction. The turnbuckle 500 has two threaded eyelets. One threaded eyelet is screwed into the cut end of the part, and the other threaded eyelet into the cut end of the other part. The turnbuckle 500 is turned to the right or left to adjust the straight line length of the first or second upper stabilizer bar 310 or 320, and to adjust the length of the first or second lower stabilizer bar 340 or 350. A nut may be employed to eliminate any looseness between the turnbuckle and the cut end of the part of the first or second upper stabilizer bar 310 or 320, or the cut end of the part of the first or second lower stabilizer bar 340 or 350.

Figure 7:
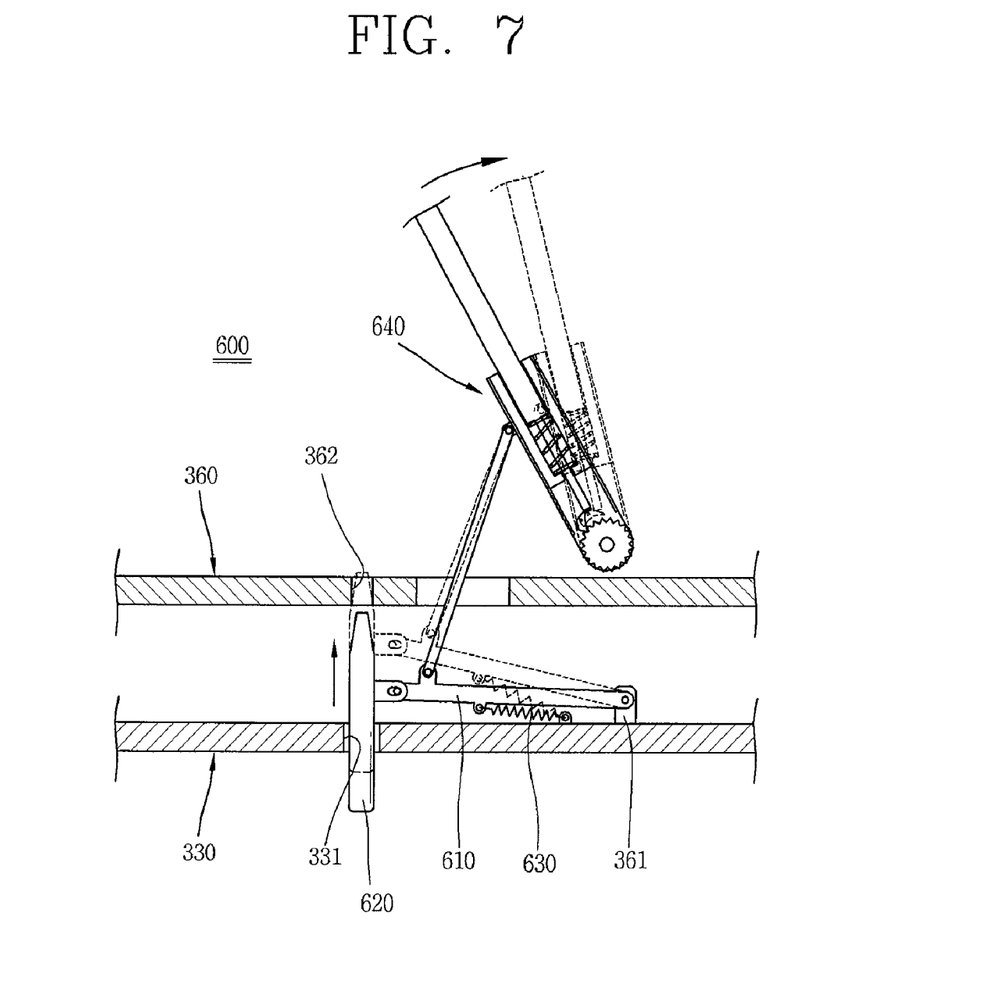
FIG. 7 is a front view of a holding unit according to the present invention.

A holding unit 600 may be provided to the stabilizer assembly 300 to fix or release the stabilizer assembly 300. The holding unit 600 can be installed on the first connecting member 330 or on the second connecting member 360. When the stabilizer assembly 300 is fixed by the holding unit 600, the body 10 of the motorcycle and the wheel 100 remain in the upright position, i.e., perpendicular to the ground.

As shown as an example in FIG. 7, the holding unit 600 includes a lever 610, one end of which is rotatably connected to a rod 361 protruding from the upper side of the first connecting member 330, a first shaft 620 moving upward or downward in response to motion of the lever 610, a spring 630 connecting the lever 610 to the first connecting member 330, and pulling the lever 610 toward the first connecting member 330, and a handling unit 640 moving the lever 610.

The first and second connecting members 330 and 360 have holes 331 and 362, respectively.

The internal diameter of the hole 331 on the first connecting member 330 is larger than the external diameter of the first shaft 620, and the internal diameter of the hole 362 is smaller than the external diameter of the first shaft 620.

The first shaft 620 has a tapered end. When the first shaft 620 moves upward, the tapered end is inserted into the hole 331 on the second connecting member 360.

To enable the holding unit 500 to hold the stabilizer assembly 300 firmly in place, the handling unit 640 is pulled up to move the lever 610 upward and then lock it. When the lever 610 is locked, the tapered end of the first shaft 620 remains inserted into the hole 362. At this point, the other end of the first shaft 620 remains inserted into the hole 331 of the first connecting member 330.

The first and second connecting members 330 and 360 are held firmly in place because the tapered end and the other end of the first shaft 620 are inserted into the hole 362 on the second connecting member 360 and the hole 331 on the first connecting member 330, respectively.

When the stabilizer assembly 300 needs to be moved, the lever 610 can be released using the handling unit 640. When the lever 610 is released, the spring 630 forces the lever 610 to moves downward, thereby withdraw the tapered end of the first shaft 620 from the hole 362. As a result, the first and second connecting members 330 and 360 are free to move.

The main body 700 of the sidecar is typically used for transporting a passenger or for carrying a cargo. The main body 700 is installed on the second connecting member 360 of the stabilizer assembly 300.

The main body 700 includes the body 710 with a space inside, a door provided on one side of the body 710, a passenger seat 730 provided inside the body 710. The body 710 includes a front panel, two lateral panels, a rear panel, and a bottom panel.

A window 740 protecting the passenger from wind is provided on the front panel of the body 710. A cover unit 750 is provided on the body 710. The cover unit 750 serves to shut out light and rain.

The cover unit 750 includes a flexibly operating roof 751 and a frame 752 supporting the flexibly operating roof 751. By manipulating the frame 752 The flexibly operating roof 751 can be opened or enclosed.

Operation of the sidecar is now described.

The sidecar is attached to or detached from the body 10 of the motorcycle using the jointing unit 400.

The sidecar, attached to the motorcycle, is driven as the motorcycle is driven.

The motorcycle, while driven in a straight line, is kept in the upright position. While the motorcycle is driven in the upright position, the wheel 100 is rotated, with the wheel supporting assembly 200 and the wheel 100 in the upright position.

Figure 8:
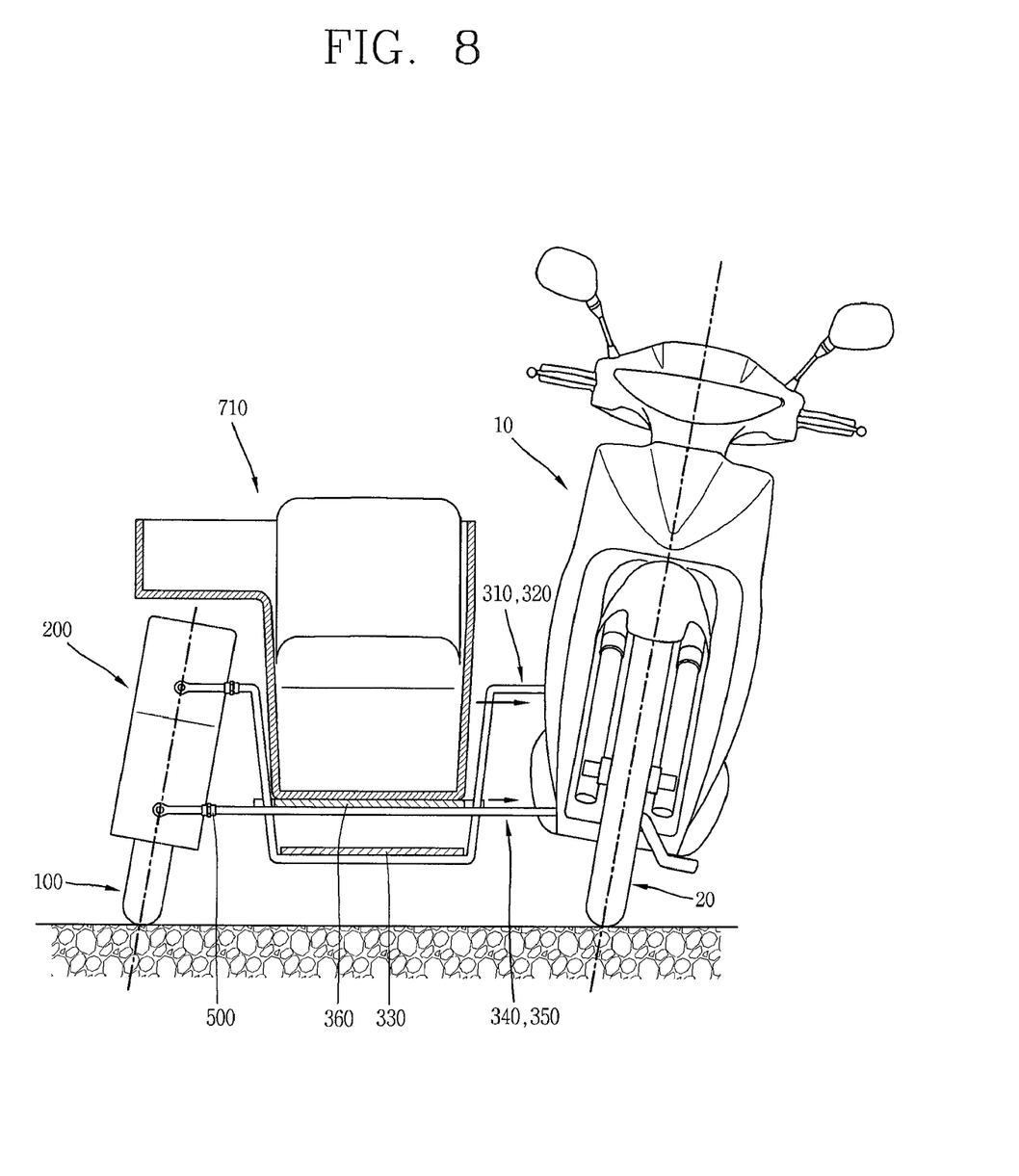
FIGS. 8 and 9 are views that help explain how the motorcycle sidecar operates according to the present invention.
Figure 9:
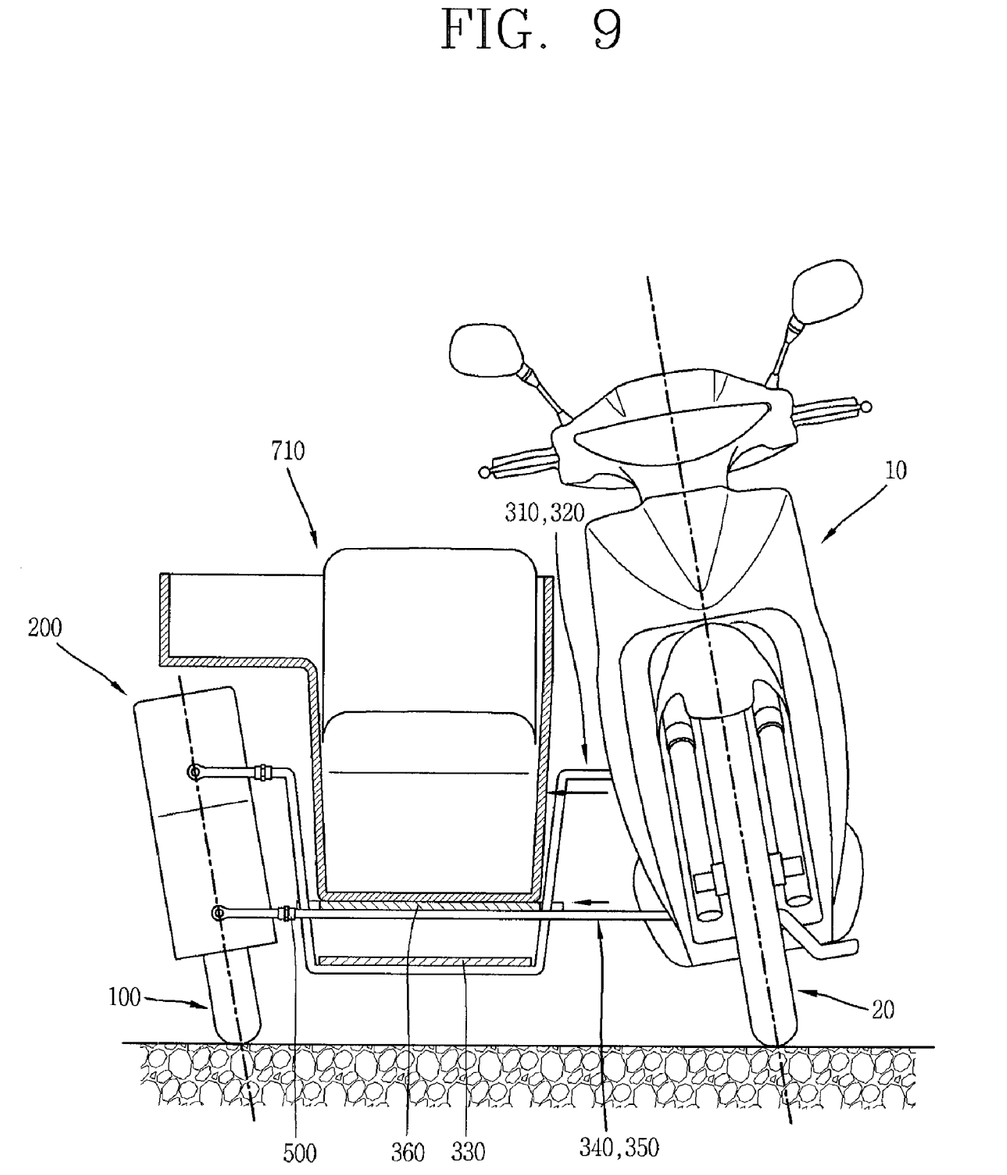

When turning to the left, the motorcycle is driven with being leaned to the left. When viewed from the front as shown in FIG. 8, the motorcycle is driven with being leaned to the right. When the motorcycle is leaned to the right, the stabilizer assembly 300 keeps the wheel supporting assembly 200 leaned to the right at the same angle with the ground. This causes the wheel 100, supported by the wheel supporting assembly 200, to be leaned to the right at the same angle with the ground.

When the motorcycle is leaned to the right, the first and second upper stabilizer bars 310 and 320 is leaned to the right further than the first and second lower stabilizer bars 340 and 350. This is because the first and second upper stabilizer bars 310 and 320 is located at a higher position from the ground than the first and second lower stabilizer bars 340 and 350. As a result, the upper portion of the wheel supporting assembly 200, connected to the first and second upper stabilizer bars 310 and 320, is leaned to the right (i.e., toward the body 10 of the motorcycle). This causes the wheel 100 to be leaned to the right. At this point, the wheel supporting assembly 200 is leaned to the right, at the same angle with the ground as the motorcycle.

When turning to the right, the motorcycle is driven with being leaned to the right. When viewed from the front as shown in FIG. 8, the motorcycle is driven with being leaned to the left. When the motorcycle is leaned to the left, the stabilizer assembly 300 keeps the wheel supporting assembly 200 leaned to the left at the same angle with the ground. This causes the wheel 100, supported by the wheel supporting assembly 200, to be leaned to the left at the same angle with the ground. At this point, the stabilizer assembly 300 operates in the same manner as it does when the motorcycle is leaned to the left (when viewed from the front shown in FIG. 8).

As above described, when the motorcycle is leaned to the right or left during driving, the wheel 100 is leaned to the right or left at the same angle with the ground as the motorcycle. Thus, the motorcycle can be safely driven without reducing the speed to the considerable degree, when it goes around a curve. That is, the motorcycle can be driven at higher speed when it goes around a curve without the risk of overturning.

The main body 700 of the sidecar is installed on the second connecting member 360 connecting the first and second lower stabilizer bars 340 and 350, not on the first horizontal portions 312 and 322 of the first upper stabilizer 310 and the first horizontal portions 322 and 326 of the second upper stabilizer. This makes the main body's center of gravity descend, thereby making the sidecar stable.

The stoppers 1,2,3, and 4 are provided to the stabilizer assembly 300 to prevent the wheel 100 and the motorcycle from being leaned to the right or left more than the given angle and thereby from overturning When the motorcycle is driven at low speed in a straight line, the first and second connecting members 330 and 360 are held firmly in place, with the holding unit 600. Thus, the motorcycle can be driven in a straight line without being leaned to the right or left.

The cover unit 750 provided to the main body shuts out light and rain to protect the passenger.

The motorcycle sidecar according to the present invention may be attached to a bicycle.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A motorcycle sidecar comprising:
   a wheel positioned a given distance from wheels of a motorcycle:
   a wheel supporting assembly supporting the wheel in a manner that enables the wheel to be rotated, and absorbing road shocks;
   a stabilizer assembly connecting the wheel supporting assembly to a body of the motorcycle to enable the wheel supporting assembly to be leaned when the motorcycle is leaned, wherein the stabilizer assembly comprises first and second upper stabilizer bars, one end of each being movably connected to a upper portion of the wheel supporting assembly and the other end of each being detachably connected to a upper portion of the body of the motorcycle, a first connecting member connecting the first and second upper stabilizer, first and second lower stabilizer bars, one end of each being movably connected to a lower portion of the wheel supporting assembly and the other end of each being detachably connected to a lower portion of the body of the motorcycle, and a second connecting member connecting the first and second lower stabilizer bars; and a main body installed on the stabilizer assembly, for transporting a passenger or a thing.

2. The motorcycle sidecar according to claim 1, wherein a connecting point of the stabilizer assembly and the wheel supporting assembly is in a wheel center line.

3. The motorcycle sidecar according to claim 1, wherein each of the first and second upper stabilizer bars and the first and second lower stabilizer bars has a socket on one end and the wheel supporting assembly has four connection parts which are movably connected to the four sockets, respectively.

4. The motorcycle sidecar according to claim 1, wherein the other end of each of the first and second upper stabilizer bars and the first and second lower stabilizer bars is detachably connected to the body of the motorcycle, with a jointing unit.

5. The motorcycle sidecar according to claim 1, wherein each of the first and second upper stabilizer bars has a horizontal portion which is positioned under the first and second lower stabilizer bars, and the first connecting member is connected to the horizontal portions, thereby being positioned under the second connecting member on which to mount a main body of the motorcycle sidecar.

6. The motorcycle sidecar according to claim 1, wherein each of the first and second upper stabilizer bars and the first and second lower stabilizer bars has a length adjusting unit for adjusting length of each.

7. The motorcycle sidecar according claim 1, wherein each of the first and second upper stabilizer bars further comprises a stopper limiting movement range in which each of the first and second upper stabilizer bars can move.

8. The motorcycle sidecar according claim 1, wherein the stabilizer assembly further comprises a holding unit for holding the stabilizer assembly firmly in place to keep the wheel in the upright position while the body of the motorcycle in the upright position, and for releasing the stabilizer assembly.

9. The motorcycle sidecar according to claim 1, wherein the main body further comprises a cover unit for enclosing or open upper side of the main body.

* * * * *